(12) United States Patent
Payton et al.

(10) Patent No.: US 7,379,840 B2
(45) Date of Patent: May 27, 2008

(54) ARRANGING MOBILE SENSORS INTO A PREDETERMINED PATTERN

(75) Inventors: David W. Payton, Calabasas, CA (US); Eric B. Martinson, Marietta, GA (US)

(73) Assignee: Raytheon Company, Waltham, MA (US)

( * ) Notice: Subject to any disclaimer, the term of this patent is extended or adjusted under 35 U.S.C. 154(b) by 641 days.

(21) Appl. No.: 10/890,568

(22) Filed: Jul. 12, 2004

(65) Prior Publication Data

US 2006/0015222 A1    Jan. 19, 2006

(51) Int. Cl.
*G05B 1/02* (2006.01)
(52) U.S. Cl. .................. 702/150; 700/247; 700/302
(58) Field of Classification Search ............ 702/93–95, 702/150, 152, 153, 158, 159; 33/1 G, 286, 33/533, 613, 645; 700/302, 247, 248; 73/85, 73/127; 356/399, 616; 324/245, 246
See application file for complete search history.

(56) References Cited

U.S. PATENT DOCUMENTS

| 4,639,667 | A | * | 1/1987 | Andresen | 324/207.18 |
| 5,134,369 | A | * | 7/1992 | Lo et al. | 324/245 |
| 5,160,848 | A | * | 11/1992 | Saitoh et al. | 250/548 |
| 5,179,329 | A | * | 1/1993 | Nishikawa et al. | 318/587 |
| 5,463,722 | A | * | 10/1995 | Venolia | 345/662 |
| 6,344,651 | B1 | | 2/2002 | Woolaway et al. | 250/370.08 |
| 6,496,157 | B1 | | 12/2002 | Mottier | 343/853 |
| 2002/0196193 | A1 | | 12/2002 | Butler et al. | 343/766 |

FOREIGN PATENT DOCUMENTS

WO    WO 03/043124 A1    5/2003
WO    WO 2005/029641 A1    3/2005

OTHER PUBLICATIONS

Reif, John H., et al., "*Social potential fields: A distributed behavioral control for autonomous robots*," Robotics and Autonomous Systems 27 (1999), 0921-8890/99, © 1999 Published by Elsevier Science B.V., pp. 171-194.

Balch, T., et al., "Social Potentials for Scalable Multi-Robot Formations," *IEEE International Conference on Robotics and Automation (ICRA-2000)*, San Francisco, 2000, 8 pages.

Fredslund, J., et al., "*Robot Formations Using Only Local Sensing and Control*," http://cres.usc.edu/cgi-bin/print_pub_details.pl?pubid=89, 6 pages, Jun. 2004.

(Continued)

*Primary Examiner*—Manuel L. Barbee
(74) *Attorney, Agent, or Firm*—Baker Botts L.L.P.

(57) ABSTRACT

Moving a target mobile node to arrange a number of mobile nodes includes determining a first direction. A first relative position for each of the neighboring mobile nodes of the target mobile node is established. The target mobile node moves according to a first alignment procedure to align the mobile nodes in the first direction. A second direction substantially orthogonal to the first direction is determined. A second relative position for each of the neighboring mobile nodes is established. The target mobile node moves according to a second alignment procedure to align the mobile nodes in the second direction.

14 Claims, 3 Drawing Sheets

OTHER PUBLICATIONS

Gervasi, V., et al., Coordination without Communication: The Case of the Flocking Problem, Preprint submitted to Elsevier Science, http://circe.di.unipi.it/~gervasi/Papers/dam02.pdf, 33 pages, Jun. 2004.

Kelly, I.D., et al., "*Flocking By The Fusion of Sonar and Active Infrared Sensors on Physical Autonomous Mobile Robots*,":http://www.cyber.rdg.ac.uk/includes/publications/01410.pdf, 4 pages, Jun. 2004.

Mamei, M., et al., "*Distributed Motion Coordination with Co-Fields: a Case Study in Urban Traffic Management*," http://polaris.ing.unimo.it/Zambonelli/PDF/isads.pdf, 8 pages, Jun. 2004.

Reynolds, Craig W., "*Flocks, Herds, and Schools: A Distributed Behavioral Model*," Published in Computer Graphics, 21(4), (ACM SIGGRAPH '87 Conference Proceedings, Anaheim, California, Jul. 1987, http://www.cs.toronto.edu/~dt/siggraph97-course/cwr87/, 19 pages, Jun. 2, 2004.

Spears, William M., et al., "*Using Artificial Physics to Control Agents*," Proceedings of the IEEE International Conference on Information, Intelligence, and Systems (ICIIS '99), 9 pages, www.cs.uwyo.edu/~wspears/papers/iciis99.pdf, Jun. 2004.

Suzuki, I., et al., "*Distributed Anonymous Mobile Robots: Formation of Geometric Patterns*," Abstract, SIAM Journal on Computing, vol. 28, No. 4, © 1999 Society for Industrial and Applied Mathematics; http://epubs.siam.org/sam-bin/dbq/article/28292, 1 page, Jul. 9, 2004.

Suzuki, I., et al., "*Distributed Anonymous Mobile Robots: Formation of Geometric Patterns*," SIAM Journal on Computing, vol. 28, No. 4, © 1999 Society for Industrial and Applied Mathematics, pp. 1347-1363.

Communication from the European Patent Office, European Search Report dated Oct. 31, 2005 for International Application No. 05254348.5-2206 PCT/, 5 pages.

\* cited by examiner

ARRANGING MOBILE SENSORS INTO A PREDETERMINED PATTERN

TECHNICAL FIELD

This invention relates generally to the field of mobile sensors and more specifically to arranging mobile sensors into a predetermined pattern.

BACKGROUND

Mobile nodes may automatically arrange themselves according to certain techniques to form a desired pattern. For example, mobile sensors may arrange themselves in a regular lattice pattern to operate as a phased-array sensor. According to one technique for arranging mobile nodes, mobile nodes use simple local control laws in order to form and maintain coherent group movement. According to another technique, mobile nodes orient themselves with respect to a reference frame, determine vacant positions of a pattern, and then move to fill in the vacant positions. According to another technique, mobile nodes are repulsed or attracted by their neighboring mobile nodes by an artificial gravity to arrange the nodes.

Certain techniques, however, generally do not yield sufficiently accurate relative positions between mobile nodes. Other techniques are not effective in achieving a regular pattern from an initially random distribution of nodes, or are not effective in forming a large regularly-spaced lattice pattern. Some techniques may result in a large number of local minima, where multiple mobile nodes are vying for the same location or multiple forces prevent a mobile node from assuming the correct position.

Known techniques may have difficulty forming precise patterns with a large number of mobile nodes. Accordingly, known techniques for arranging mobile nodes may be insufficient in certain situations.

SUMMARY OF THE DISCLOSURE

In accordance with the present invention, disadvantages and problems associated with previous techniques for arranging mobile nodes may be reduced or eliminated.

According to one embodiment of the present invention, moving a target mobile node to arrange a number of mobile nodes includes determining a first direction. A first relative position for each of the neighboring mobile nodes of the target mobile node is established. The target mobile node moves according to a first alignment procedure to align the mobile nodes in the first direction. A second direction substantially orthogonal to the first direction is determined. A second relative position for each of the neighboring mobile nodes is established. The target mobile node moves according to a second alignment procedure to align the mobile nodes in the second direction.

According to one embodiment of the present invention, moving a target mobile node to align a number of mobile nodes includes determining an actual relative position for neighboring mobile nodes. An error value for each neighboring mobile node is calculated. An error value of a neighboring mobile node describes a difference between the actual relative position of the neighboring mobile node and a desired relative position of the neighboring mobile node. If the combined calculated error values yields a high error value, a noise vector is applied to a force vector directing the motion of the target mobile node.

Certain embodiments of the invention may provide one or more technical advantages. A technical advantage of one embodiment may be that the mobile nodes may align themselves with respect to a first direction and then align themselves with respect to a second direction, which may provide for a more efficient manner of arranging the mobile nodes in a pattern. Another technical advantage of one embodiment may be that random motion may be introduced in mobile nodes that are far from their desired positions, which may reduce local minima.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
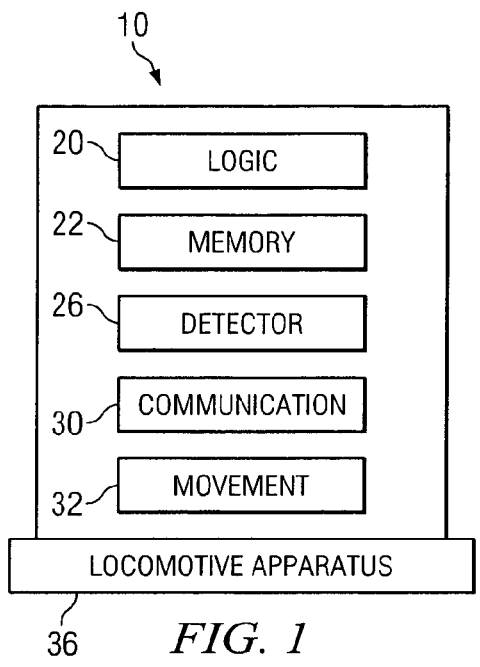
FIG. 1 is a block diagram illustrating one embodiment of a mobile node that may move with respect to other mobile nodes to form a specific pattern.

FIG. 1 is a block diagram illustrating one embodiment of a mobile node 10 that may move with respect to other mobile nodes 10 to form a specific pattern. The resulting arrangement of mobile nodes may be used as a phased-array sensor. According to one embodiment, mobile nodes 10 may arrange themselves in a first direction and then in a second direction to generate the pattern. According to another embodiment, random motions may be introduced into the motion of mobile nodes 10 that are far from their desired positions. The random motions may remove the mobile nodes 10 from local minima, which may allow mobile nodes 10 to settle to the pattern.

According to one embodiment, mobile node 10 may comprise a mobile sensor. According to the illustrated embodiment, mobile node 10 includes logic 20, a memory 22, a detector 26, a communications module 30, a movement module 32, and a locomotive apparatus 36. Logic 20 manages the operation of node 10, and may comprise any suitable hardware, software, or combination of hardware and software. For example, logic 20 may include a processor. As used in this document, the term "processor" refers to any suitable device operable to execute instructions and manipulate data to perform operations.

Memory 22 stores and facilitates retrieval of information used by logic 20, and may include Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

Detector 26 may include one more sensors that aid mobile node 10 in positioning itself. Detector 26 may include an orienting sensor that mobile node 10 uses to detect a reference direction, which may be specified by a user. For example, an orienting sensor may comprise a compass. Detector 26 may include a position sensor that mobile node 10 uses to determine its position relative to other mobile nodes 10. For example, a relative localization sensor may be used to determine relative position. The range of a position sensor may be selected in accordance to the desired spacing between mobile nodes 10. For example, the sensor may have a range of approximately one to four times the desired spacing, such as one and one-half to two times the desired spacing, for example, approximately 1.75 or approximately 2.75 times the desired spacing.

Detector 26 may also include one or more information sensors that receive information, for example, surveillance information, from the environment of mobile node 10. The information may be received in any suitable manner, for example, as infrared, light, ultraviolet, or other electromagnetic radiation, sound waves, seismic waves, or other suitable waves. According to one embodiment, detector 26 includes a non-line-of-sight sensor and a precession line-of-sight sensor for obtaining the range and azimuth to neighboring nodes. The information may be stored at mobile node 10 for future retrieval, or may be communicated to a remote station.

Communication module 30 may include one or more devices that mobile node 10 may use to receive, transmit, or both transmit and receive information. The information may be transmitted in any suitable manner, for example, using radio frequency waves. Communication module 30 may include devices for communicating with other mobile nodes 10, a remote station, or other entity. According to one embodiment, communications module 30 may included a dedicated high bandwidth communication device and dedicated high bandwidth short haul communication device. According to one embodiment, communications module 30 may be omitted.

Movement module 32 controls locomotive apparatus 36 to move mobile node 10 from one position to another position. Movement module 32 may use any suitable method for moving mobile node 10. For example, movement module 32 may use any of the example methods described with reference to FIGS. 2 through 5.

Locomotive apparatus 36 may include any suitable structure operable to move mobile node 10 from one position to another position. Examples of locomotive apparatus 36 include one or more wheels, one or more belts, one or more legs, one or more propulsion devices, or other device suitable for moving mobile node 10.

Mobile nodes 10 may form a pattern such as a regular pattern. A regular pattern may refer to a pattern that comprises only one type of regular polygon such as triangles, squares, or hexagons. The pattern defines a desired spacing between mobile nodes 10. In general, a regular pattern is defined by repetition of a given geometric shape formed by nodes, where repeated shapes occur at constant spacing to one another. Any suitable number of mobile nodes 10 may be used to cover a particular area. For example, approximately six to ten nodes such as approximately eight nodes may be used to cover a two kilometer square area. Any number of nodes may be used, however, such as ten to one thousand nodes.

Modifications, additions, or omissions may be made to mobile node 10 without departing from the scope of the invention. The components of mobile node 10 may be integrated or separated according to particular needs. Moreover, the operations of mobile node 10 may be performed by more, fewer, or other modules. For example, the operations of detector 26 and communications module 30, may be performed by one module, or the operations of movement module 32 may be performed by more than one module. Additionally, operations of mobile node 10 may be performed using any suitable logic comprising software, hardware, other logic, or any suitable combination of the preceding. As used in this document, "each" refers to each member of a set or each member of a subset of a set.

Figure 2A:
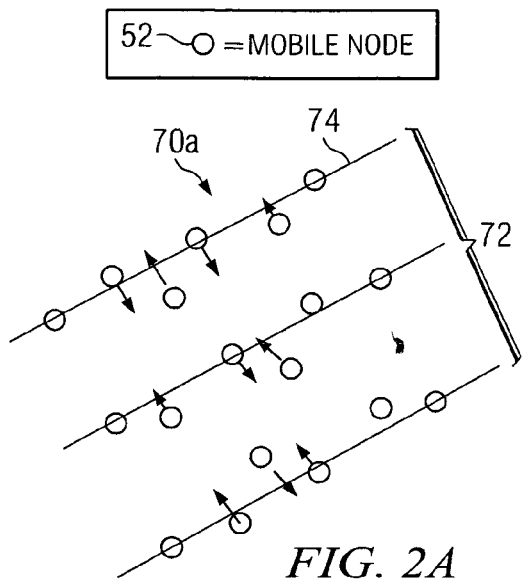
FIGS. 2A through 2C are diagrams illustrating one embodiment of a line force method for arranging mobile nodes.
Figure 2B:
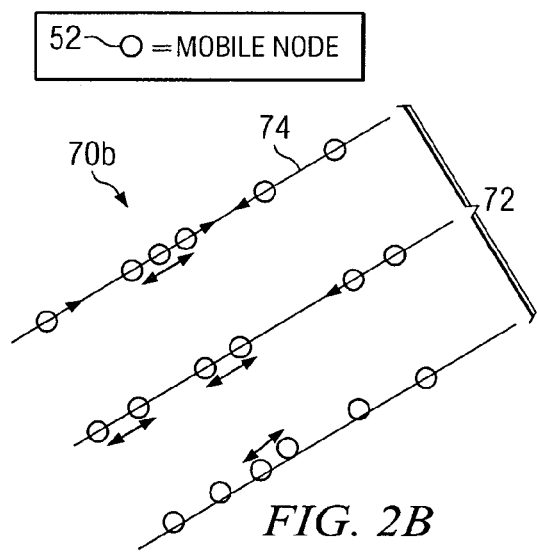
Figure 2C:
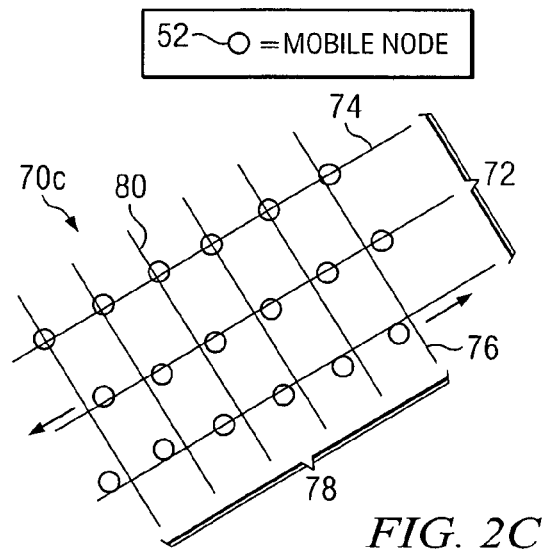

FIGS. 2A through 2C are diagrams 70a-c illustrating one embodiment of a line force method for arranging mobile nodes 52. In general, mobile nodes 52 arrange themselves in a first direction using a first line set and then in a second direction using a second line set to form a desired pattern. A direction may be measured with respect to a reference direction. A reference direction may refer to a direction selected by a user. A line set may refer to a set of lines substantially parallel, that is, aligned in one direction. A line set may be used to define desired spacing between mobile nodes 52 in a direction orthogonal to the lines.

Referring to FIG. 2A, a diagram 70a illustrates mobile nodes 52 aligning in a first direction defined by a first line set 72 that includes lines 74. In general, mobile nodes 52 move to the nearest line 74 of first line set 72. Mobile nodes 52 may be moved according to any suitable alignment procedure, such as either of the alignment procedures described with reference to FIGS. 3A through 4B. An alignment procedure refers to a process for aligning mobile nodes 52 in a particular direction. Mobile nodes 52 may determine first relative positions among themselves during the alignment procedure.

Referring to FIG. 2B, a diagram 70b illustrates mobile nodes 52 that have been aligned in the first direction defined by a first line set 72. Mobile nodes 52 of a line 74 move along line 74 to provide a desired spacing between mobile nodes 52 of line 74. Mobile nodes 52 may be moved according to any suitable alignment procedure. According to one alignment procedure, a mobile node 52 determines second relative positions, that is, the distance between itself and adjacent nodes of the same line 74. Mobile node 52 moves in a direction to attempt to achieve a desired spacing between the mobile nodes 74. For example, mobile node 52 may move closer to an adjacent mobile node that is farther away than the desired spacing, and farther away from an adjacent mobile node that is closer than the desired spacing. The second relative positions may similar to or different from the first relative positions. According to one embodiment, the relative positions may be determined throughout the execution of the first and second alignment procedures.

Referring to FIG. 2C, a diagram 70c illustrates mobile nodes 52 aligning themselves in a second direction defined by a second line set 78 that includes lines 80. According to the illustrated embodiment, mobile nodes 52 of a line 74 move in one direction as a group, and mobile nodes 52 of adjacent lines 74 move in opposite directions.

Mobile nodes 52 of a line 74 may move in the same direction by establishing a common spin state. The spin states of mobile nodes 52 may be adjusted such that the majority of mobile nodes 52 of a line 74 have the same spin, while a majority of mobile nodes of a neighboring line 74 have the opposite spin. At predetermined intervals, a target mobile node 52 of a line 74 probabilistically changes its spin state if mobile nodes 52 of the same line 74 have the opposite spin state or if the mobile nodes 52 of neighboring line 74 have the same spin state as the target node. At some point, most mobile nodes 52 of line 74 may have the same spin state, and most mobile nodes 52 of neighboring line 74 may have the opposite spin state.

Modifications, additions, or omissions may be made to the method without departing from the scope of the invention. The method may include more, fewer, or other steps. Additionally, steps may be performed in any suitable order or simultaneously without departing from the scope of the invention. For example, the mobile nodes may align themselves in the first direction and in the second direction simultaneously.

Figure 3A:
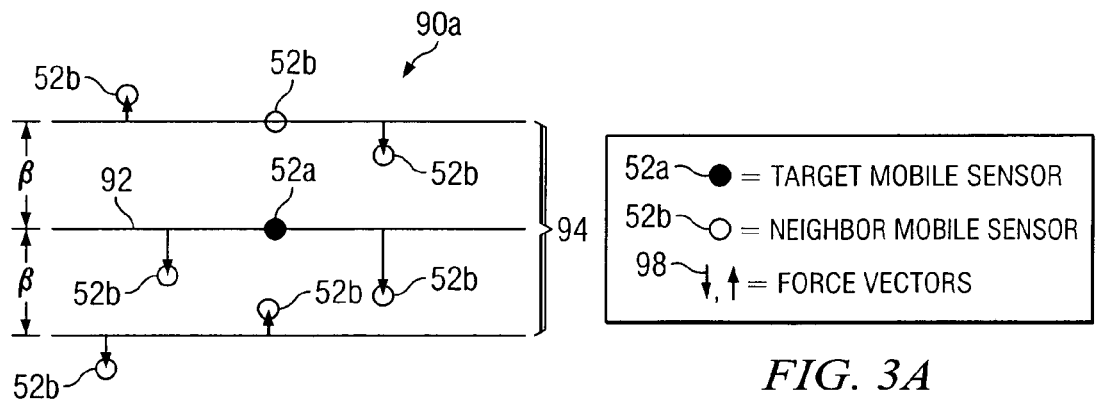
FIGS. 3A and 3B are diagrams illustrating one embodiment of an alignment procedure for aligning mobile nodes in one direction.
Figure 3B:
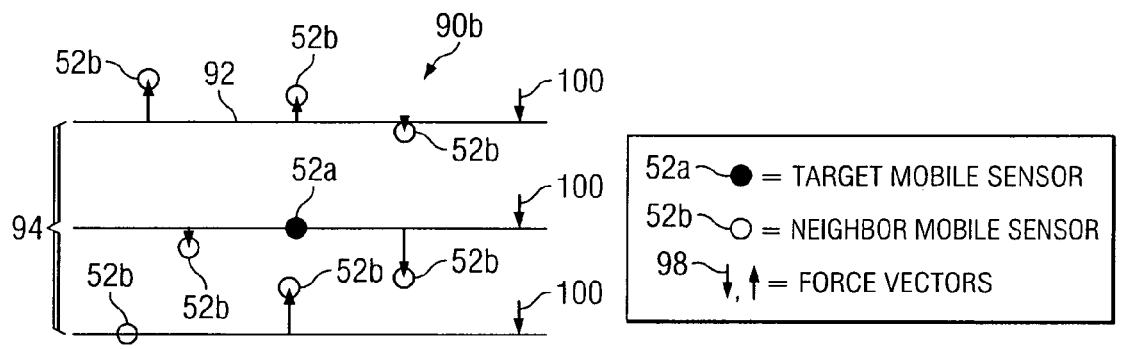

FIGS. 3A and 3B are diagrams 90a-b illustrating one embodiment of an alignment procedure for aligning mobile nodes 52 in one direction. The alignment procedure is performed by each mobile node 52 of the mobile nodes 52. For ease of illustration, the alignment procedure is described as performed by a target mobile node 52a surrounded by neighboring mobile nodes 52b. A neighboring mobile node 52b of a target mobile node 52a may refer to one or more mobile nodes 52b closest to target mobile node 52a. A neighboring mobile node 52b may be identified as any mobile node 52b within a predetermined radius of target mobile node 52a. A neighboring mobile node 52b may also be identified as the closest X number of mobile nodes 52b to target mobile node 52a, where X is a predetermined number such as four or eight.

Referring to FIG. 3A, diagram 90a illustrates target mobile node 52a placing an imaginary line set 94 over itself. Line set 94 includes lines 92 with a spacing of β, where a specific target line 92 corresponds to target mobile node 52a. Target mobile node 52a may determine the direction of line set 94 using an orienting device. Next, neighboring mobile nodes 52b are classified as either belonging on the same line 92 as target mobile node 52a or on an adjacent line 92. For example, a whichline function $l_i$ given by Expression (1) may be used to classify node i:

$$l_i = \text{round}\left(\frac{V_i^p \sin(d\theta_i)}{\beta}\right) \quad (1)$$

where α is the current heading minus a desired alignment, $V_i$ is the vector towards node i, $V_i^\theta$ is the angular component of $V_1$, $V_i^p$ is the magnitude of $V_i$, and $d\theta_i = V_i^\theta - \alpha$. If $l_i = 0$, then node belongs to the same line as target mobile node 52a. If $l_i = 1$, then node i belongs on an adjacent line.

An offset vector representing the offset distance between a neighboring mobile node 52b and the nearest line 92 is determined for each neighboring mobile node 52b. An offset vector is orthogonal to line 92 and has a magnitude equal to the offset distance. The offset distance may be calculated using a distance function $dist_i$ given by Equation (2):

$$dist_i = \left|\frac{l_i * \beta}{\sin(d\theta_i)}\right| \quad (2)$$

Force vectors 98 are generated in accordance with the distances, and may be orthogonal to lines 92. If a neighboring mobile node 52b is too close to target mobile node 52a, a repelling vector is generated from that neighboring mobile node 52b. Otherwise, an attractive vector is generated toward that neighboring mobile node 52b. The sum of force vectors 98 is calculated, ignoring the moment about the center, to yield a net force vector. Vectors 98 may be summed according to Equation (3):

$$\text{vector\_output} = \Sigma\left(\frac{V_i^p - dist}{dist_i}, V_i^\theta\right) \quad (3)$$

Referring to FIG. 3B, diagram 90b illustrates the movement of line set 94 to align target mobile node 52a with neighboring mobile nodes 52b. The net force vector calculated from force vectors 98 of a neighboring mobile nodes 52b may be used to determine the movement of target mobile node 52a. According to the illustrated embodiment, net force vector 100 is used to direct the movement of target mobile node 52a.

Modifications, additions, or omissions may be made to the alignment procedure without departing from the scope of the invention. The alignment procedure may include more, fewer, or other steps. Additionally, steps may be performed in any suitable order without departing from the scope of the invention.

Figure 4A:
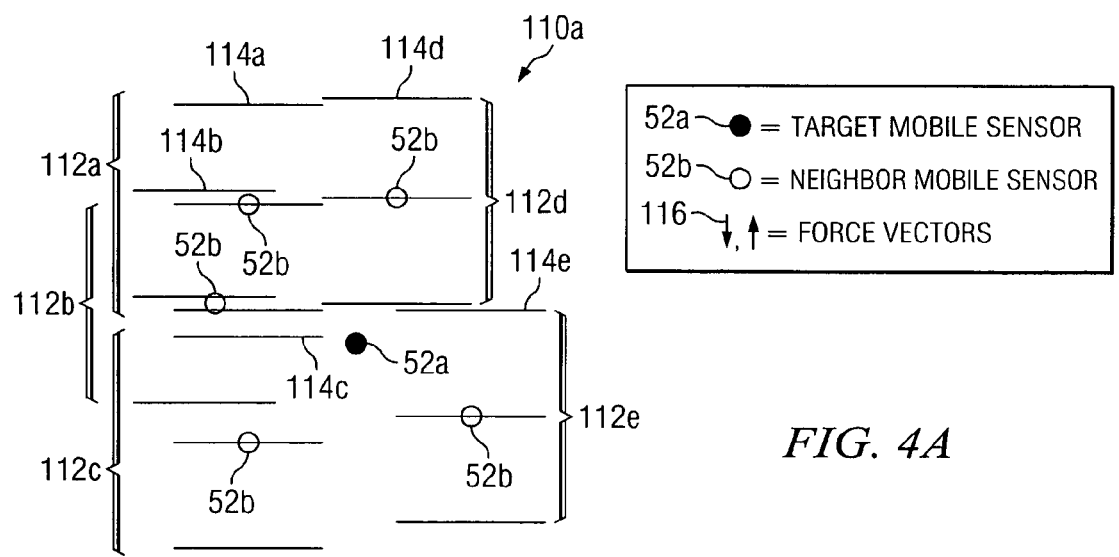
FIGS. 4A and 4B are diagrams illustrating another embodiment of an alignment procedure for aligning mobile nodes in one direction.
Figure 4B:
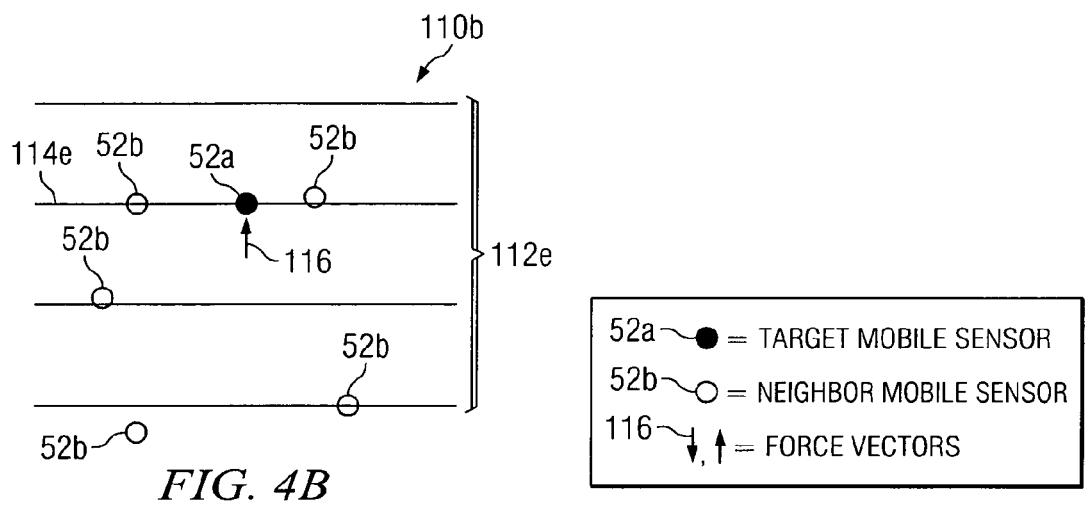

FIGS. 4A and 4B are diagrams 110a-b illustrating another embodiment of an alignment procedure for aligning mobile nodes 52 in one direction. According to the embodiment, a line set that best fits neighboring mobile nodes 52b is identified, and then the target mobile node 52a moves towards the identified line set.

FIG. 4A is a diagram 110a illustrating hypothesis line sets 112 with lines 114. A hypothesis line set 112 refers to a line set corresponding to a neighboring mobile node 52b. A hypothesis line set 112 may be selected as a line set towards which target mobile node 52a is moved. A hypothesis may be generated according to Equation (4):

$$H_i = V_i^p \sin(d\theta_i) - l_i * \beta \quad (4)$$

where whichline function $l_i$ may be defined by Equation (1).

Lines 114 are substantially parallel, so each hypothesis line set 112 may be represented as a magnitude orthogonal to lines 114. Each magnitude may be regarded as a center of a Gaussian distribution with unit standard deviation. If the Gaussian distributions are summed, then the point with the highest sum identifies the average magnitude of the hypotheses.

Each hypothesis line set 112 may be scored to select the best fitting hypothesis line set 112. The best fitting hypothesis line set 112 may refer to the line set that best fits neighboring mobile nodes 52b. A hypothesis line set 12 may be scored by summing up the Gaussians of the average magnitude according to Equation (5):

$$\text{score}_i = \sum_{k=1}^{n} \eta_k(H_i^p) \quad (5)$$

where $\eta_i$ is a normal distribution centered at $H_i$ with σ=1, so $\eta_i(x)$ is normal distribution η sampled at x. The hypothesis line set 112 with the highest score $H_s$ is selected. According to the illustrated embodiment, hypothesis set 112e is the best fitting hypothesis set.

FIG. 4B is a diagram 110b illustrating the movement of target mobile node 52a towards best fitting hypothesis set 112e. A force vector $V_H$ 116 from target mobile node 52a to the nearest line 114e of line set 112e is generated. Target 52a is moved to line 114e of line set 112e. An adjustment force that adjusts the selected hypothesis line set 112e to better fit neighboring mobile nodes 52b may also be generated according to Equation (6):

$$l_i = \text{round}\left(\frac{V_i^p \sin(d\theta_i) - H_s}{\beta}\right) \quad (6)$$

Modifications, additions, or omissions may be made to the alignment procedure without departing from the scope of the invention. The alignment procedure may include more, fewer, or other steps. Additionally, steps may be performed in any suitable order without departing from the scope of the invention.

Figure 5:
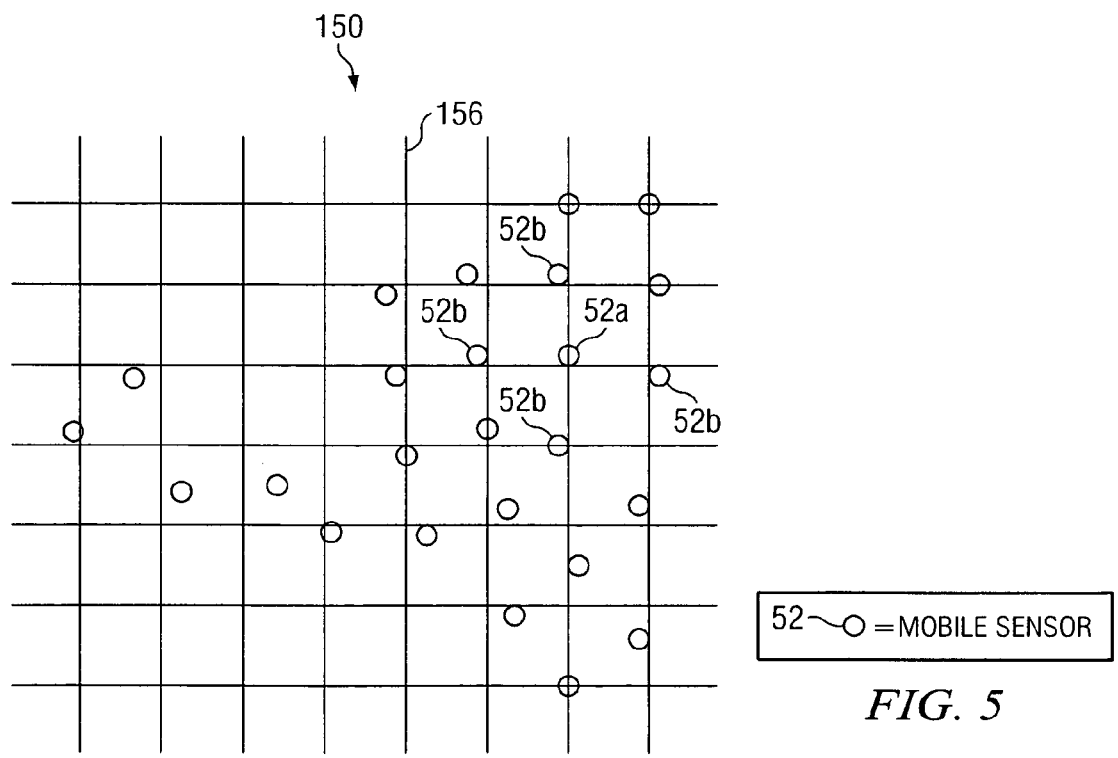
FIG. 5 is a diagram that illustrates one embodiment of a local annealing method for arranging mobile nodes.

FIG. 5 is a diagram 50 that illustrates one embodiment of a local annealing method for arranging mobile nodes 52. The local annealing method may be used in conjunction with any suitable method for arranging mobile nodes 52, such as a method described with reference to FIGS. 2 through 4. According to one embodiment, a method for arranging mobile nodes 52 may be used to generate a preliminary arrangement of mobile nodes 52 that approximate a desired pattern. The local annealing method may be used to locally disturb the preliminary arrangement in regions where there is a high degree of mismatch from the desired pattern in order to reduce local minima.

Diagram 150 illustrates mobile nodes 52. A fitness error value is determined for each mobile node 52. For example, a fitness error value is determined for target mobile node 52a. The fitness error value of target mobile node 52a measures the difference between the actual relative positions of neighboring mobile nodes 52b and the expected relative positions of neighboring mobile nodes 52b. The expected relative position of a mobile node 52 refers to the position of mobile node 52 in the desired pattern. For example, the intersections of a grid 156 may represent the expected relative positions of mobile nodes 52. A good match between the actual relative positions and the expected relative positions yields a low fitness error value, and a poor match yields a high fitness error value.

The fitness error value may be calculated in any suitable manner. For example, the actual positions $p_{act,i}$ for neighboring mobile nodes i, where i=1, . . . , N, may be determined, and compared with the expected positions $p_{exp,i}$ for mobile nodes i. The fitness error value may be determined according to Equation (7):

$$e = \sum_{i}^{N} (P_{act,i} - P_{exp,i})^2 \quad (7)$$

A random noise factor for each mobile node 52 is generated in accordance with the fitness error value of the mobile node 52. The larger the fitness error value, the larger the magnitude of the noise factor. The random noise factor is summed with other force vectors to determine the movement of mobile node 52. A larger noise factor typically causes node 52 to move randomly in a jiggling motion. Accordingly, nodes 52 with a larger fitness error value may move with a greater jiggling motion. The jiggling motion may cause other neighboring mobile nodes 52 to move as well, which may overcome a local minimum to allow nodes 52 to settle into the desired pattern.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that the mobile nodes may align themselves with respect to a first direction and then align themselves with respect to a second direction, which may provide for a more efficient manner of arranging the mobile nodes in a pattern. Another technical advantage of one embodiment may be that random motion may be introduced in mobile nodes that do not detect a good match with the desired local pattern, which may reduce local minima.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for moving a target mobile node to arrange a plurality of mobile nodes, comprising:

determining a first direction at a target mobile node of a plurality of mobile nodes;

establishing a first relative position for each of one or more neighboring mobile nodes of the target mobile node, the plurality of mobile nodes comprising the neighboring mobile nodes;

moving the target mobile node according to a first alignment procedure applied to the first relative positions to align the plurality of mobile nodes in the first direction, the first alignment procedure comprising moving the target mobile node to align the plurality of mobile nodes with respect to a first line set comprising a plurality of first lines parallel to the first direction;

determining a second direction substantially orthogonal to the first direction;

establishing a second relative position for each of the one or more neighboring mobile nodes; and moving the target mobile node according to a second alignment procedure applied to the second relative positions to align the plurality of mobile nodes in the second direction.

2. The method of claim 1, wherein:

the second alignment procedure further comprises moving the target mobile node along a first line to align the plurality of mobile nodes with respect to a second line set comprising a plurality of second lines parallel to the second direction.

3. The method of claim 1, wherein at least one of the first alignment procedure and the second alignment procedure comprises:

establishing a target line set comprising a plurality of lines parallel to a direction of one of the first direction and the second direction, a line of the target line set passing through the target mobile node;

calculating an offset vector for each of the one or more neighboring mobile nodes, an offset vector for a neighboring mobile node representing a distance between the neighboring mobile node and a line of the target line set, the offset vector orthogonal to the line; and moving the target mobile node to minimize the sum of the offset vectors.

4. The method of claim 1, wherein at least one of the first alignment procedure and the second alignment procedure further comprises:

establishing a neighboring line set for each of the one or more neighboring mobile nodes, a neighboring line set comprising a plurality of lines parallel to a direction of one of the first direction and the second direction;

selecting a neighboring line set of the neighboring line sets that best fits the one or more neighboring mobile nodes; and moving the target mobile node towards the selected neighboring line set.

5. The method of claim 1, wherein:

the second alignment procedure further comprises moving the target mobile node towards a first predetermined spacing between the target mobile node and a first adjacent mobile node and a second predetermined spacing between the target mobile node and a second adjacent mobile node, the target mobile node, the first adjacent mobile node, and the second adjacent mobile node corresponding to a line of the first line set.

6. The method of claim 1, wherein:

the second alignment procedure further comprises moving the target mobile node along a first line in the same direction as the direction of movement of the other mobile nodes of the first line, the direction opposite to the direction of movement of the mobile nodes of an adjacent first line.

7. A system for moving a target mobile node to arrange a plurality of mobile nodes, comprising:

a memory operable to store data; and a processor coupled to the memory and operable to:

determine a first direction at a target mobile node of a plurality of mobile nodes;

establish a first relative position for each of one or more neighboring mobile nodes of the target mobile node, the plurality of mobile nodes comprising the neighboring mobile nodes;

move the target mobile node according to a first alignment procedure applied to the first relative positions to align the plurality of mobile nodes in the first direction, the first alignment procedure further comprises moving the target mobile node to align the plurality of mobile nodes with respect to a first line set comprising a plurality of first lines parallel to the first direction;

determine a second direction substantially orthogonal to the first direction;

establish a second relative position for each of the one or more neighboring mobile nodes; and move the target mobile node according to a second alignment procedure applied to the second relative positions to align the plurality of mobile nodes in the second direction.

8. The system of claim 7, wherein:

the second alignment procedure further comprises moving the target mobile node along a first line to align the plurality of mobile nodes with respect to a second line set comprising a plurality of second lines parallel to the second direction.

9. The system of claim 7, wherein at least one of the first alignment procedure and the second alignment procedure comprises:

establishing a target line set comprising a plurality of lines parallel to a direction of one of the first direction and the second direction, a line of the target line set passing through the target mobile node;

calculating an offset vector for each of the one or more neighboring mobile nodes, an offset vector for a neighboring mobile node representing a distance between the neighboring mobile node and a line of the target line set, the offset vector orthogonal to the line; and moving the target mobile node to minimize the sum of the offset vectors.

10. The system of claim 7, wherein at least one of the first alignment procedure and the second alignment procedure further comprises:

establishing a neighboring line set for each of the one or more neighboring mobile nodes, a neighboring line set comprising a plurality of lines parallel to a direction of one of the first direction and the second direction;

selecting a neighboring line set of the neighboring line sets that best fits the one or more neighboring mobile nodes; and moving the target mobile node towards the selected neighboring line set.

11. The system of claim 7, wherein:

the second alignment procedure further comprises moving the target mobile node towards a first predetermined spacing between the target mobile node and a first adjacent mobile node and a second predetermined spacing between the target mobile node and a second adjacent mobile node, the target mobile node, the first adjacent mobile node, and the second adjacent mobile node corresponding to a line of the first line set.

12. The system of claim 7, wherein:

the second alignment procedure further comprises moving the target mobile node along a first line in the same direction as the direction of movement of the other mobile nodes of the first line, the direction opposite to the direction of movement of the mobile nodes of an adjacent first line.

13. A system for moving a target mobile node to arrange a plurality of mobile nodes, comprising:

means for determining a first relative direction at a target mobile node of a plurality of mobile nodes;

means for establishing a first relative position for each of one or more neighboring mobile nodes of the target mobile node, the plurality of mobile nodes comprising the neighboring mobile nodes;

means for moving the target mobile node according to a first alignment procedure applied to the first relative positions to align the plurality of mobile nodes in the first direction, the first alignment procedure further comprises moving the target mobile node to align the plurality of mobile nodes with respect to a first line set comprising a plurality of first lines parallel to the first direction;

means for determining a second direction substantially orthogonal to the first direction;

means for establishing a second relative position for each of the one or more neighboring mobile nodes; and means for moving the target mobile node according to a second alignment procedure applied to the second relative positions to align the plurality of mobile nodes in the second direction.

14. A method for moving a target mobile node to arrange a plurality of mobile nodes, comprising:

determining a first direction at a target mobile node of a plurality of mobile nodes;

establishing a first relative position for each of one or more neighboring mobile nodes of the target mobile node, the plurality of mobile nodes comprising the neighboring mobile nodes;

moving the target mobile node according to a first alignment procedure applied to the first relative positions to align the plurality of mobile nodes in the first direction, the first alignment procedure further comprising moving the target mobile node to align the plurality of mobile nodes with respect to a first line set comprising a plurality of first lines parallel to the first direction, the first alignment procedure comprising at least one of a first process and a second process, the first process comprising:

establishing a target line set comprising a first line set, a line of the target line set corresponding to the target mobile node;

calculating an offset vector for each of the one or more neighboring mobile nodes, an offset vector for a neighboring mobile node representing a distance between the neighboring mobile node and a line of the target line set, the offset vector orthogonal to the line; and moving the target mobile node to minimize the sum of the offset vectors; the second process comprising:

establishing a neighboring line set for each of the one or more neighboring mobile nodes, a neighboring line set comprising a first line set;

selecting a neighboring line set of the neighboring line sets that best fits the one or more neighboring mobile nodes; and moving the target mobile node towards the selected neighboring line set;

determining a second direction substantially orthogonal to the first direction;

establishing a second relative position for each of the one or more neighboring mobile nodes;

moving the target mobile node according to a second alignment procedure applied to the second relative positions to align the plurality of mobile nodes in the second direction, the second alignment procedure further comprising moving the target mobile node along a first line to align the plurality of mobile nodes with respect to a second line set comprising a plurality of second lines parallel to the second direction, the second alignment procedure further comprising:

moving the target mobile node towards a first predetermined spacing between the target mobile node and a first adjacent mobile node and a second predetermined spacing between the target mobile node and a second adjacent mobile node, the target mobile node, the first adjacent mobile node, and the second adjacent mobile node corresponding to a line of the first line set; and moving the target mobile node along a first line in the same direction as the direction of movement of the other mobile nodes of the first line, the direction opposite to the direction of movement of the mobile nodes of an adjacent first line;

determining an actual relative position for each of the neighboring mobile nodes;

calculating an error value for each neighboring mobile node, an error value of a neighboring mobile node describing a difference between the actual relative position of the neighboring mobile node and an expected relative position of the neighboring mobile node;

determining that the calculated error values yield a high error value;

generating a noise vector in accordance with the high error value;

applying the noise vector to a force vector directing the motion of the target mobile node; and moving the target mobile node according to the force vector directing the motion of the target mobile node.

* * * * *